J. P. BROPHY.
CLUTCH.
APPLICATION FILED DEC. 24, 1909.
992,938.
Patented May 23, 1911.
2 SHEETS—SHEET 1.
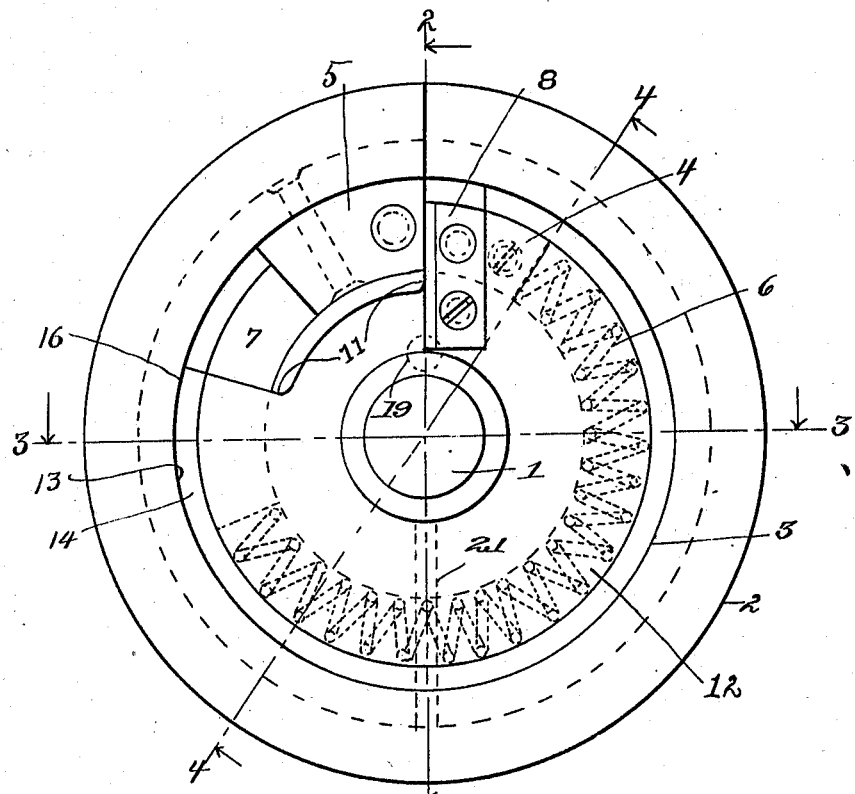
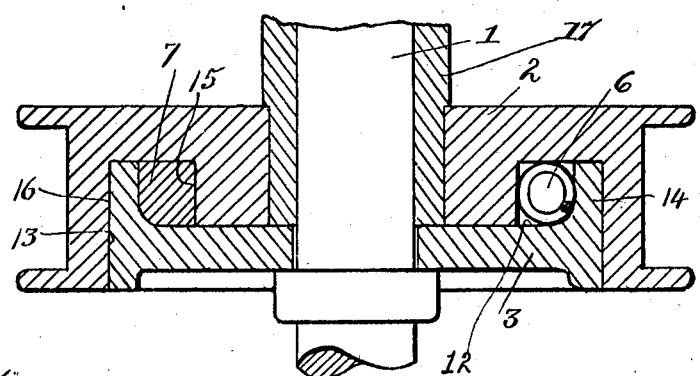
Witnesses:
Robert M. Six
Jno. F. Oberlin
Inventor:
John P. Brophy
by J. B. Fay
Attorney.

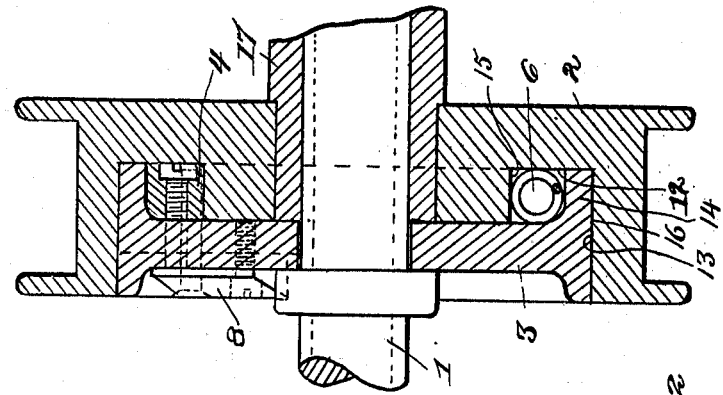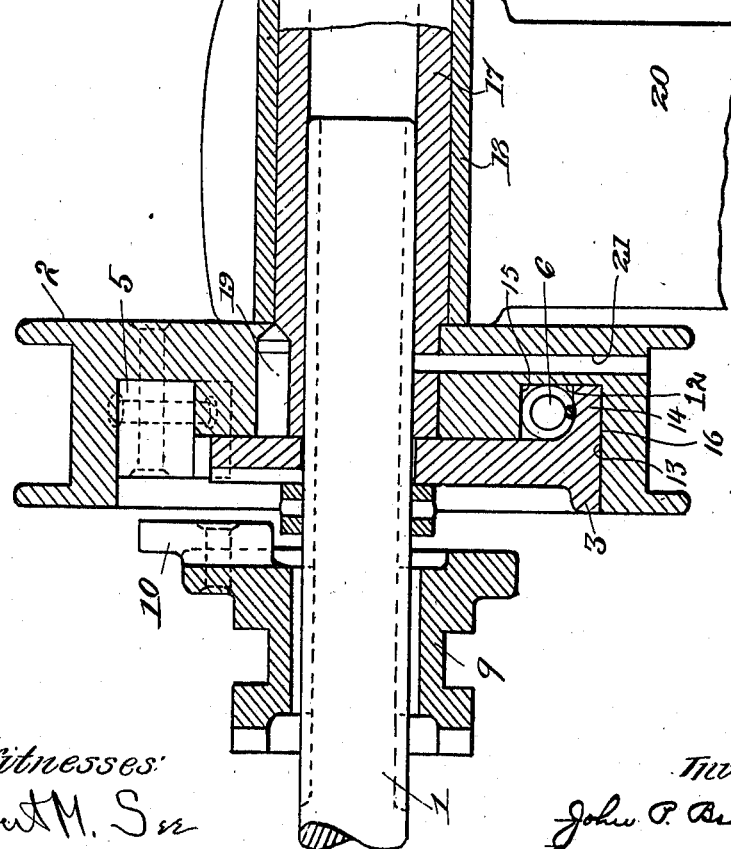

UNITED STATES PATENT OFFICE.

JOHN P. BROPHY, OF CLEVELAND, OHIO.

CLUTCH.

992,938.

Specification of Letters Patent. Patented May 23, 1911.

Application filed December 24, 1909. Serial No. 534,764.

*To all whom it may concern:*

Be it known that I, JOHN P. BROPHY, a citizen of the United States, and a resident of Cleveland, county of Cuyahoga, and State of Ohio, have invented a new and useful Improvement in Clutches, of which the following is a specification, the principle of the invention being herein explained and the best mode in which I have contemplated applying that principle, so as to distinguish it from other inventions.

My invention relates to mechanism by which a driven part may be alternatively connected or disconnected with a driving member, and relates particularly to mechanism of this general class in which a projection on one member is adapted to engage a projection on the other.

The general object of the invention is the provision of a clutch of this type adapted to cushion the blow which occurs when the driving and driven members are thrown into engagement, and to provide a clutch so cushioned which will be of simple construction and capable of economical manufacture.

To the accomplishment of these and related ends said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of my invention may be used.

In said annexed drawings:—Figure 1 is a front elevation of the driving member; Fig. 2 is a section thereof and of the driven member, taken on the line 2—2 in Fig. 1; Fig. 3 is a section of the driving member taken on the line 3—3 in Fig. 1, and Fig. 4 is a section of the driving member taken on the line 4—4 in Fig. 1.

The driving member in my improved clutch mechanism consists of a pulley 2 which, during operation, is designed to be rotated at any desired constant speed. The pulley 2 is provided on its outer face with an annular recess 13, and in this recess is seated a disk 3 having an opening 11 therein, the disk being loosely seated in such recess so that it may rotate relatively to the pulley by which it is carried. The disk 3 is formed with a peripheral flange 14, which bears against the peripheral wall 16 of recess 13; the pulley hub 15 is of less diameter than the flange 14, so that between the juxtaposed faces of the pulley and the disk 3 there is formed an annular opening 12. The juxtaposed faces of the pulley and disk are provided respectively with projections 5 and 4 which are fixedly secured to such faces and extend outwardly into the annular opening 12. A block 7 is loosely seated in the annular opening 12 and bears at one end against the projection 5 which is secured to the pulley. A compression spring 6 is seated in the opening 12 and abuts at one end against block 7, and at the other end against the projection 4 which is secured to the disk 3, the compression spring tending to restrain rotation of the disk 3 relatively to the pulley 2. By interposing a loose block 7 between the projection 5 and the spring 6, the tension of the spring may be changed at will by substituting a block of different length for the one then in use. Furthermore, the projection 5 is adapted to engage the side of opening 11 in disk 3 (see Fig. 2) to limit relative rotation of the disk, and the block 7 obviates extending the loose flexible spring into the opening 11, with the consequent danger of its flying from its seat. A tooth 8 is fixedly secured to the outer face of the disk 3 and projects outwardly therefrom. A support 20 is provided with a bushing 18 within which is a rotatable sleeve 17 to which the pulley 2 is secured by a pin 19. Through the sleeve 17 extends the shaft 1 which is adapted to drive any suitable desired machine, the shaft 1 being provided with longitudinal grooves as shown by dotted lines, Figs. 2 and 4, while an opening 21 through the pulley 2 and sleeve 17 provides for lubrication of the bearing. A clutch 9 is splined upon shaft 1, the clutch 9 being, then, rotatable with shaft 1 but axially movable thereon. The face of clutch 9 contiguous to the outer face of the pulley 2 is provided with a steel tooth 10 which is adapted, when the clutch is at the limit of its forward movement, to engage the tooth 8 which is fixed on the disk carried by the pulley. On the outer end of sleeve 17 may be secured a disk 22 adapted to drive, or be driven by, an ordinary friction disk at variable speed.

From this brief description, the operation and advantages of my improved clutch will be obvious. If the driving pulley is revolving and the clutch is thrown into engagement by engaging the tooth thereon with the tooth on the disk, a heavy blow is caused at the moment of engagement. The shock of this blow in usual clutch mechanism is ultimately destructive of the rigid parts subjected to it, but it will be readily understood that if my invention be utilized, the effect of such blow will be to partly rotate the disk carried by the pulley against the force of the spring tending to restrain such rotation. The effect of this yielding of the tooth on the pulley against the force of the spring is to cause complete absorption of the shock of that blow so that engagement of the clutch will not be attended by the serious wear upon the various operative parts. It is further to be noted that I have provided engaging teeth which are made relatively long, and which for this reason afford an excellent contacting surface; at the same time the teeth are so attached to the disk and to the clutch respectively that they may be quickly removed and replaced by new teeth when constant use renders such replacement necessary.

It need scarcely be explained that various equivalent devices may be used in place of the compression spring to form the resilient backing for the movable tooth on the driving member.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a rotatable driving member provided with a hub and with a recess in one face, a disk loosely seated in said recess, said disk being provided with an inwardly extending peripheral flange bearing against the peripheral wall of said recess, the flange of said disk being of greater diameter than the hub of said driving member so that an annular opening extends between the adjacent faces of the member and disk, and said member and disk each being provided with a projection on their adjacent faces, a block loosely disposed in said annular opening adjacent to the projection on said member, a compression spring disposed in said opening between said block and the projection on the disk, said disk being provided on its outer face with a tooth, and a rotatable member to be driven and adapted to engage the tooth on the disk.

2. In a device of the character described, the combination of a rotatable driving member provided with a recess in one face, a disk loosely seated in such recess and provided with an inwardly extending flange bearing against the peripheral wall of said recess, said member and disk being each provided with a projection on their adjacent faces, a compression spring disposed between said projections, and a member to be driven and adapted to engage said disk.

3. In a device of the character described, the combination of a rotatable driving member provided with a hub and with a recess in one face, a disk loosely seated in such recess and provided with an inwardly extending flange bearing against the peripheral wall of said recess, the diameter of the flange on said disk being greater than that of the hub of said member so that an annular opening extends between the adjacent faces of the member and disk, said member and disk being each provided with a projection on their adjacent faces, a compression spring disposed in said annular opening between said projections, said disk being provided on its outer face with a tooth, and a rotatable member to be driven and adapted to engage the tooth on the disk.

Signed by me this 21st day of December, 1909.

JOHN P. BROPHY.

Attested by—
 ANNA L. GILL,
 JNO. F. OBERLIN.

---

Copies of this patent may be obtained for five cents each, by addressing the "Commissioner of Patents, Washington, D. C."